No. 883,803. PATENTED APR. 7, 1908.
A. HERZ.
APPARATUS FOR INCASING TOOTHPICKS AND THE LIKE.
APPLICATION FILED JUNE 12, 1907.

4 SHEETS—SHEET 1.

WITNESSES

INVENTOR

BY

ATTORNEYS

No. 883,803. PATENTED APR. 7, 1908.
A. HERZ.
APPARATUS FOR INCASING TOOTHPICKS AND THE LIKE.
APPLICATION FILED JUNE 12, 1907.

4 SHEETS—SHEET 2.

WITNESSES

INVENTOR
Alexander Herz
BY
Redding Hiddle Greeley
ATTORNEYS

No. 883,803. PATENTED APR. 7, 1908.
A. HERZ.
APPARATUS FOR INCASING TOOTHPICKS AND THE LIKE.
APPLICATION FILED JUNE 12, 1907.

4 SHEETS—SHEET 3.

WITNESSES
INVENTOR
Alexander Herz
BY
ATTORNEYS

No. 883,803. PATENTED APR. 7, 1908.
A. HERZ.
APPARATUS FOR INCASING TOOTHPICKS AND THE LIKE.
APPLICATION FILED JUNE 12, 1907.
4 SHEETS—SHEET 4.
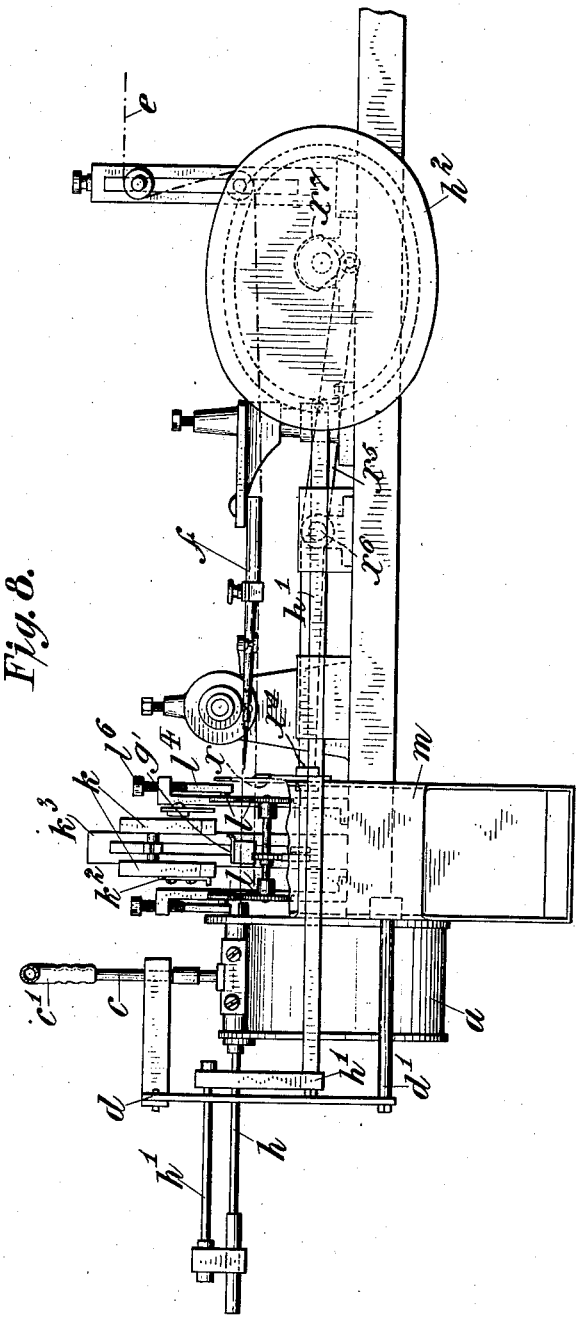
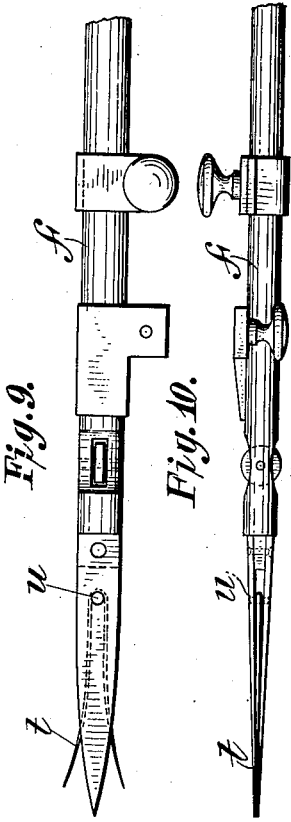
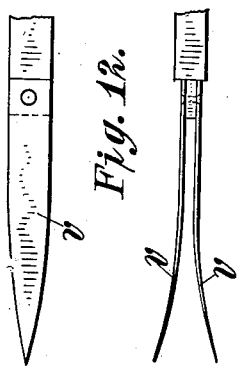

UNITED STATES PATENT OFFICE.

ALEXANDER HERZ, OF NEW YORK, N. Y.

APPARATUS FOR INCASING TOOTHPICKS AND THE LIKE.

No. 883,803.   Specification of Letters Patent.   Patented April 7, 1908.

Application filed June 12, 1907. Serial No. 378,577.

*To all whom it may concern:*

Be it known that I, ALEXANDER HERZ, a citizen of the United States, and a resident of the borough of Manhattan, of the city of New York, in the county and State of New York, have invented certain new and useful Improvements in Apparatus for Incasing Toothpicks and the Like, of which the following is a specification, reference being had to the accompanying drawings, forming a part hereof.

The object of this invention is to provide an apparatus by means of which toothpicks and other articles of a regular or irregular shape may be conveniently incased in a paper wrapper, which apparatus shall be entirely automatic and shall not require the use of paste to seal the wrappers.

Figure 1:
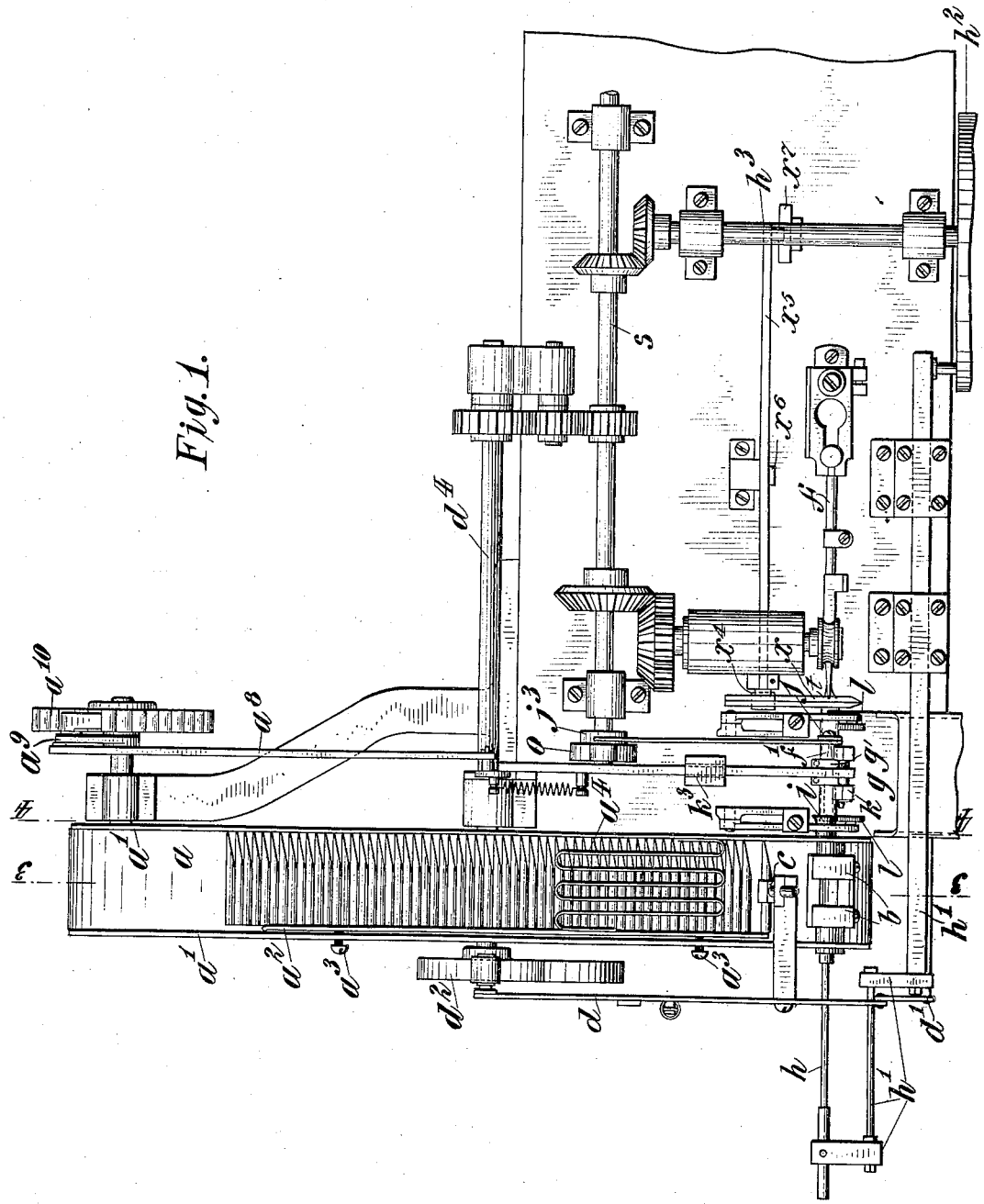
Figure 2:
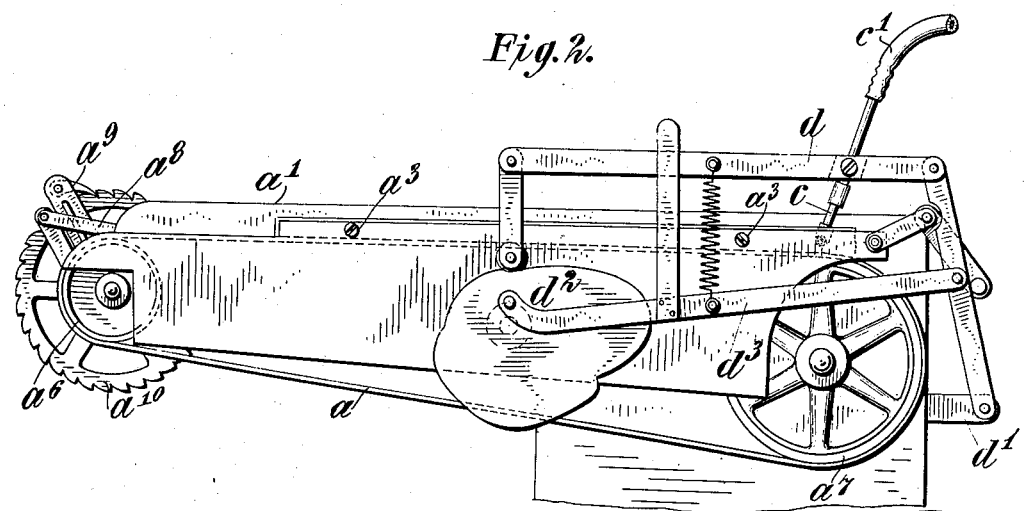
Figure 3:
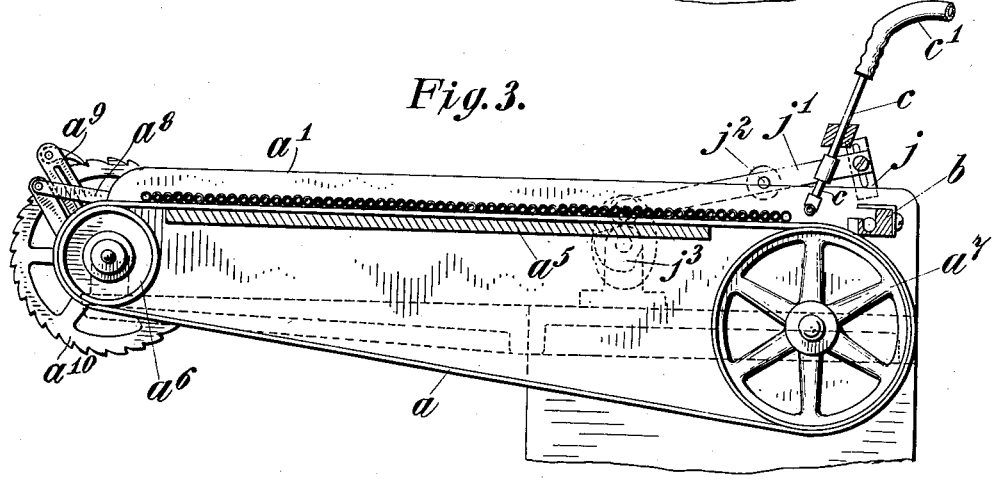
Figure 4:
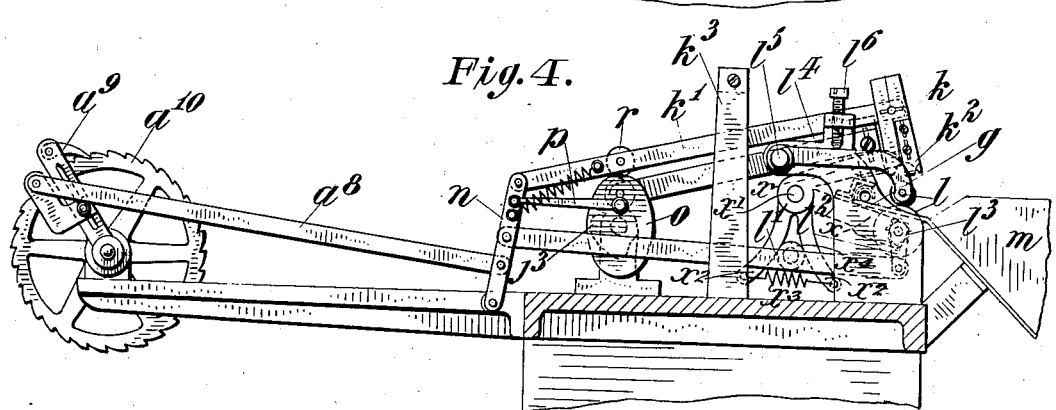
Figure 5:
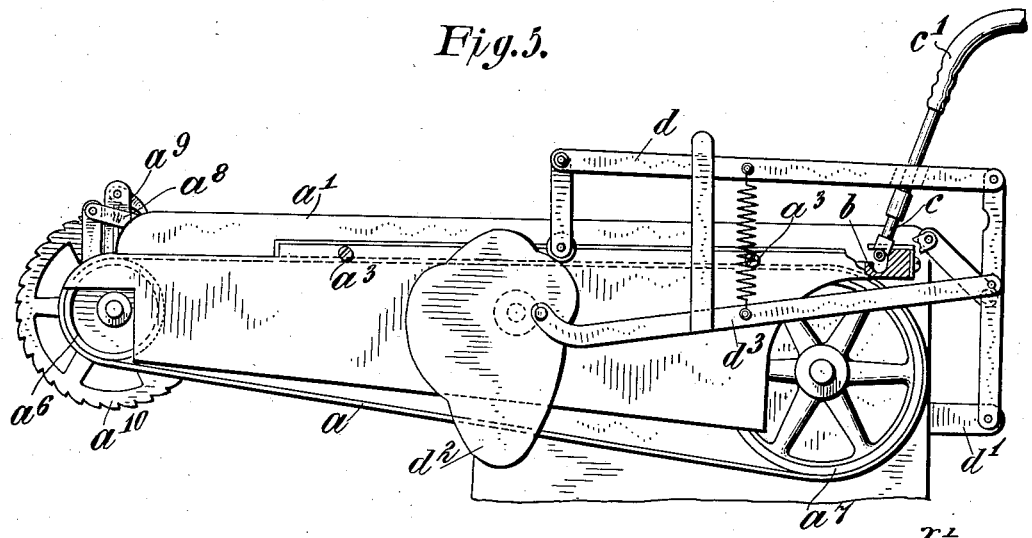
Figure 6:
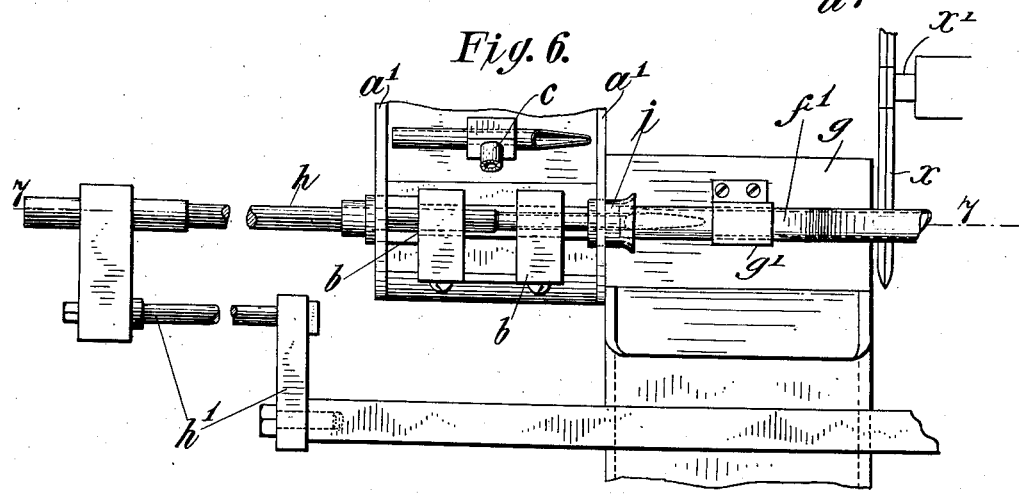
Figure 7:
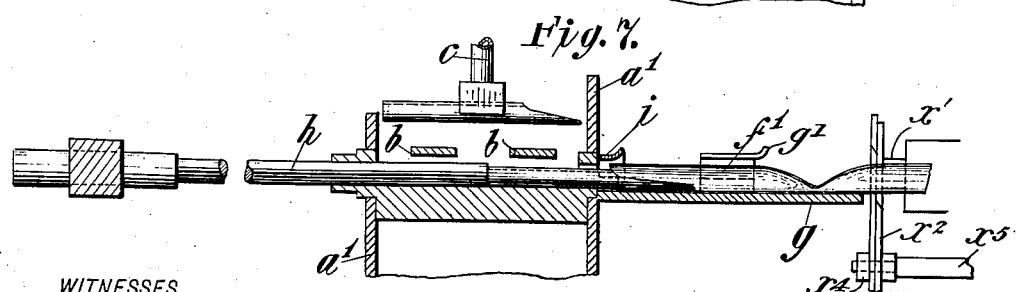

The various features of invention are fully described hereinafter and with reference to the accompanying drawings in which, Figure 1 is a plan view of a sufficient portion of an apparatus embodying the invention to enable the latter to be understood. Fig. 2 is a view in end elevation as seen from the left in Fig. 1. Figs. 3 and 4 are both views in vertical section taken on the planes indicated by the lines 3—3 and 4—4 respectively in Fig. 1. Fig. 5 is a view similar to that of Fig. 2, except that it is partly broken away and some of the parts are in a slightly different position. Fig. 6 is a detail plan view on a larger scale, illustrating a tube to be filled in its relation to the feeding and filling devices. Fig. 7 is a detail view in vertical section on the same scale, the plane of the section being indicated by the line 7—7 in Fig. 6. Fig. 8 is a view of the apparatus in side elevation. Figs. 9 and 10 are views in elevation on an enlarged scale, showing two sides of what is referred to as the "stick" upon which the tubes are formed from a flat strip of paper. Figs. 11 and 12 are similar views in detail, showing a slightly different form for the end of said "stick."

The apparatus illustrated in the drawings was designed especially for handling quill tooth picks and for simplicity in describing and claiming the invention, the word "picks" will be used to refer to the articles which are to be incased in a paper wrapper, and the word "tube" will be used to refer to the wrapper, although it will be understood that these terms may not be the broadest ones which might be employed for this purpose.

The picks are fed into the machine by means of a suitable feeding device such as an endless belt $a$ and having side guides $a'$ and preferably an adjustable strip $a^2$ whereby the feeding device may be regulated as to size so as to accommodate picks of different lengths. This strip may be held in place by adjusting screws $a^3$ and a spring $a^4$, as will readily be understood from Fig. 1, and may be sustained through the support $a^5$ (Fig. 3) which is ordinarily provided to prevent the belt from sagging. The belt travels around pulleys $a^6$ and $a^7$ and is driven intermittently around these pulleys by means presently to be described, feeding the picks gradually into the machine.

Near the inner end of the belt and secured to the guides $a'$ and $a^2$ is what will be referred to as a seat $b$ for the picks, the latter being transferred from the belt one by one to said seat by an arm $c$. This arm is provided with some means such as a pneumatic or suction device in order to grasp a pick and hold the same until it has been deposited by said arm in the seat $b$, and for this purpose said arm may be made hollow and may be connected by a flexible tube $c'$ or the like to a suitable exhaust (not shown). Said arm $c$ is mounted upon a frame $d$ one end of which is pivoted to a bracket $d'$ and the other end of which rides upon a rotating cam member $d^2$. This member is also connected by means of a link $d^3$ with said frame and therefore serves to reciprocate said frame back and forth as well as to move it up and down in accordance with the cam surface. This motion serves to raise and lower the arm $c$ and to move it back and forth, thereby imparting to the arm $c$ the motion necessary for lifting a pick from the belt and placing the pick in the seat $b$. The latter, as will be seen from Figs. 1, 3 and 5, is constructed so as to receive the arm $c$ and the pick upon the end thereof and to hold the pick as soon as it has been released from the arm $c$.

The wrappers for the picks, which as before stated will be referred to as tubes, are of a tubular shape and are preferably formed as in a cigarette making machine. In the accompanying drawings a portion of a cigarette tube making machine has been illustrated and its relation to the present improvements shown. In said machine (Fig. 8) a flat strip of paper $e$ is fed to a forming stick $f$ by means of which the paper strip is worked into a tubular shape. The stick $f$ in the present case is adapted to fold over the edges of the strip, which folded over edges are interlocked with each other and serve to hold the strip in a tubular form as thoroughly as though these edges were stuck together by a paste, all of which is old in the art and will be readily understood, the manner of forming the flat strip into tubular form having nothing to do with the present invention. The tubular strip thus formed is fed from the end of the stick $f$ across and upon a table $g$ (Figs. 1, 4, 6 and 7) and brought substantially against the seat $b$ and in line with the pick contained therein, being delivered through a guide $g'$ which brings the tube into correct position. In this position said tube (indicated by the character $f'$) is held preferably at each end until the pick is shoved or ejected out of the seat $b$ and into the tube by means of a plunger $h$ which is operated at the proper time through suitable rod and link connections $h'$ from a cam $h^2$. The means for holding the tube while the pick is being ejected preferably comprise a hollow guide $i$ on one end which the tube slightly enters (Fig. 6) and a member $j$ (Figs. 1 and 3) which is adapted to be brought down upon the tube as soon as the same is in position and to act as a stop to limit the travel of the pick into the tube as the pick is ejected from its seat. The stop $j$ may be mounted upon an arm $j'$ pivoted at $j^2$ and caused to operate at the proper times through a cam $j^3$.

As soon as the arm $j'$ has brought the member $j$ upon the tube, the mechanism for clipping off the end of the tube commences to operate. In the present case this mechanism includes a pair of scissors the blades of which are indicated by the character $x$ in the drawing. These blades form arms of two bell crank levers which are mounted upon a pivot $x'$, the other arms $x^2$ being normally urged toward each other by a spring $x^3$ which tends to close the blades of the scissors as in the act of cutting. While the tube is being fed in the manner just described, the blades of the scissors are kept in an open position by means of a roller $x^4$ which is located between the arms $x^2$ and is carried upon a lever $x^5$ pivoted at $x^6$ and controlled by a cam $x^7$, so that as the roller $x^4$ rises the arms $x^2$ and the blades $x$ are spread apart and are maintained in this position until the roller moves down. At the proper time the cam $x^7$ moves the roller down and the spring $x^3$ draws the arms $x'$ and the blades $x$ together thus cutting off the tube.

As soon as the pick has been ejected from its seat into the tube, the stop $j$ rises and a pusher $k$ (Figs. 1, 4 and 8) drops upon the tube and shoves it forward upon the table to the means for closing the ends of the tube. These means preferably comprise a pair of fine toothed wheels $l$ which mesh with each other at either end of the tube. The under wheel of each pair of toothed wheels preferably extends through the table $g$ and receives an intermittent rotation through an arm $l'$, link $l^2$ and ratchet $l^3$ (Fig. 4), while the upper toothed wheel of each pair is preferably mounted upon an arm $l^4$ pivoted at $l^5$ and upon which a screw $l^6$ bears in order to control the closeness at which the two wheels are held together. The pusher $k$ advances the tubes $f'$, one at a time, to and through the wheels $l$ which serve to crimp the ends of the tubes, that is to form at the ends thereof a corrugated or indented fold, and thus to thoroughly close said ends. The pusher $k$ is then raised through its supporting arm $k'$ and allows the closed tube with its contained pick to drop down the chute $m$ into a suitable collector, (not shown). Before the tubes are delivered to the crimpers by the pusher $k$, they are preferably flattened by any suitable means, in the present case by the stop $j$ and a plate $k^2$ (Fig. 4) upon one end of the pusher $k$. In this way the ends of the tubes are always properly received by the crimping wheels $l$.

Referring particularly to Fig. 4, it will be seen that the intermittent motion for the crimpers and the feeding belt is provided through a swinging arm $n$ which receives its motion from a rotating member $o$ to which it is connected by a crank arm $p$. The crimpers are operatively connected to the arm $n$ through the link $l'$ while a link $a^8$ connects said arm $n$ with an adjustable pawl frame $a^9$ through which a ratchet $a^{10}$ is operated to impart to the belt $a$ the desired motion. The rotating member $o$ is oval shape and acts upon the arm $k'$ carrying the pusher $k$ through a roller $r$, while the arm $k'$ is pivoted upon the end of the swinging arm $n$. A vertical guide $k^3$ may be provided to keep the pusher $k$ and the arm $k'$ properly centered.

From Fig. 1 it will be seen that the cam member $d^2$ receives its motion from a shaft $d^4$ which receives power through suitable gears from the main shaft $s$. This main shaft, as will also be seen, drives the cam $h^2$ through the shaft $h^3$ and drives the rotating member $o$ and the cam $j^3$ directly.

In order to deliver the paper tube to the table $g$ in a more or less oval shape or partially flattened condition, which may be desirable in some cases, the end of the stick $f$ (Figs. 9 and 10) may be provided with suitable flattening means $t$. These means, as illustrated comprise a V-shaped wire $t$, the apex of which is secured around a lug $u$ in said stick in such a way that the free ends project and as will be obvious, press outwardly against the sides of the tube, thus effecting a slight crease and causing the tube to assume more or less of an oval shape. Figs. 11 and 12 illustrate another construction of the end of the stick for effecting the same result. In these figures the end of the stick consists of two flat tapering strips $v$, the ends of which are bent outwardly.

The invention is not limited to the details of construction shown and described, as many departures may be made from these details without avoiding the spirit of the invention. Neither, as has already been alluded to, is the invention limited to a machine for incasing tooth picks, as it will be readily understood that many other articles may be incased in a similar manner.

I claim as my invention:

1. In an apparatus of the character described, the combination of a seat for the picks, means to deliver picks into the seat one by one, a guide for the ends of wrapping tubes at the delivery end of the seat, means to feed the tubes one at a time up to and against the guide, and means to eject the pick from the seat through the guide and into the tube.

2. In an apparatus of the character described, the combination of a seat for the picks, means to deliver picks into the seat one by one, a tubular guide for the ends of wrapping tubes at the delivery end of the seat, means to feed the tubes one at a time into the guide, and means to eject the picks from the seat through the guide and into the tubes.

3. In an apparatus of the character described, the combination of a seat for the picks, means to deliver picks into the seat one by one, means to hold a tube to be filled comprising a guide for the tube at one end and a stop for the pick at the other end, and means to eject the pick from the seat into the tube.

4. In an apparatus of the character described, the combination of a seat for the picks, means to deliver picks into the seat one by one, a tubular guide at the delivery end of the seat, a stop piece pivoted above the tube to be filled so as to be brought down upon the tube to hold the same and act as a stop for the pick, and means to eject the pick from the seat into the tube.

5. In an apparatus of the character described, the combination of a seat for the picks, a feeding device, means to transfer the picks one by one from the feeding device into the seat, means to hold a tube to be filled, a tubular guide at the delivery end of the seat to guide the tube into position and hold one end thereof while it is being filled, a pivoted stop piece to hold the other end of the tube and act as a stop for the pick, and means to slide a pick from the seat into the tube.

6. In an apparatus of the character described, the combination of a seat for the picks, a traveling belt, means to transfer the picks one by one from the belt into the seat, means to hold the tube to be filled, and means to slide a pick from the seat into the tube.

7. In an apparatus of the character described, the combination of a seat for the picks, a traveling belt, means to transfer the picks one by one from the belt into the seat, means to hold a tube to be filled, means to slide a pick from the seat into the tube, and a regulating strip for the belt in order to adapt the machine for handling picks of different lengths.

8. In an apparatus of the character described, the combination of a seat for the picks, means to lift the picks one by one into the seat, means to hold the tube to be filled, and means to slide a pick from the seat into the tube.

9. In an apparatus of the character described, the combination of a seat for the picks, a traveling belt, pneumatic means to lift the picks one by one into the seat, means to hold a tube to be filled, and means to slide a pick from the seat into the tube.

10. In an apparatus of the character described, the combination of a seat for the picks, and means to deliver picks thereto one at a time, said means comprising means to grasp the pick, a rotating member, connections between the rotating member and last named means to raise, lower and reciprocate said last named means, means to hold a tube to be filled, and means to slide a pick from the seat into the tube.

11. In an apparatus of the character described, the combination of a seat for the picks, a feeding belt, and means to transfer picks one at a time from the belt to the seat, said means comprising a frame, a rotating cam member upon which the frame rides, and a link connecting said member and frame to reciprocate the frame.

12. In an apparatus of the character described, the combination of means to insert a pick into a tube, and means to crimp the edges at the ends of the tube together, in order to close and seal the ends of the tube.

13. In an apparatus of the character described, the combination of means to insert a pick into a tube, a fine toothed wheel and a coöperating member for each end of the tube to form at each end an indented or corrugated fold and thus to close the same.

14. In an apparatus of the character described, the combination of means to insert a pick into a tube, a pair of toothed wheels for each end of the tube and between each pair of which the ends of the tube are advanced respectively to close the same.

15. In an apparatus of the character described, the combination of means to hold a tube while it is being filled, means to form a corrugated fold at each end of the tube, and 16. In an apparatus of the character described, the combination of means to hold a tube while it is being filled, a pair of toothed wheels for each end of the tube, and means to deliver the tube to said wheels in order to crimp the ends of said tube and close said ends.

17. In an apparatus of the character described, the combination of means to hold a tube while it is being filled, a pair of toothed wheels for each end of the tube to crimp said ends, means to advance said tube to the crimping wheels, and means to rotate said crimping wheels intermittently.

18. In an apparatus of the character described, the combination of means to fill a tube, means to flatten the tube, and means to produce a corrugated fold at the ends of the tube.

19. In an apparatus of the character described, the combination of means to produce a corrugated fold at the end of a tube, and means to flatten the tube before it is presented to the folding means.

20. In an apparatus of the character described, the combination of means to produce a corrugated fold at the ends of a tube, and means to advance the tube to and through the folding means.

21. In an apparatus of the character described, the combination of means to fill a tube, means to flatten the tube, means to produce a corrugated fold at the ends of the tube, and means to advance the tube to and through the crimping means.

22. In an apparatus of the character described, the combination of a feeding device, a seat for holding picks one at a time, means to transfer the picks one at a time from the feeding device into the seat, means to hold a tube in line with a pick in the seat, means to eject the pick from the seat into the tube, and means to crimp the ends of the tube.

23. In an apparatus of the character described, the combination with a stick upon which the tubes are formed, of a substantially V-shaped wire secured to the stick at the apex of the wire so that the free ends of the wire are adapted to press outwardly against the tube and flatten the same.

This specification signed and witnessed this 29th day of May, 1907.

ALEXANDER HERZ.

Signed in the presence of—
HOMER H. SNOW,
LUCIUS E. VARNEY.